July 4, 1972  J. C. McGREGOR  3,674,638

NUCLEAR REACTOR FUEL ELEMENT ASSEMBLY

Filed April 15, 1969  2 Sheets-Sheet 1

INVENTOR
JOHN C. McGREGOR
BY
AGENT

United States Patent Office 3,674,638
Patented July 4, 1972

3,674,638
NUCLEAR REACTOR FUEL ELEMENT ASSEMBLY
John Cameron McGregor, Port Hope, Ontario, Canada, assignor to Atomic Energy of Canada Limited, Ottawa, Ontario, Canada
Filed Apr. 15, 1969, Ser. No. 816,271
Int. Cl. G21c 3/08, 3/34
U.S. Cl. 176—81                                        7 Claims

ABSTRACT OF THE DISCLOSURE

A nuclear reactor fuel element assembly wherein a plurality of fuel elements are disposed side-by-side and are joined together at an intermediate position along their lengths by pairs of pads each one of a pair being brazed to a fuel element cladding and joined to the other pad of that pair by a weld or braze having a weaker breaking strength than the fuel element claddings. Each pair of pads provides a robust joint between two fuel elements, which will break before rupture of a fuel element cladding occurs.

---

This invention relates to nuclear fuel element assemblies.

In a nuclear reactor which consists basically of fuel element assemblies disposed in vertical fuel channels in a core, the fuel channels are spaced from one another in the core and form coolant passages for passing coolant between fuel elements in the fuel element assembly. The fuel element assemblies are stacked one above another in the fuel channels and each comprise a plurality of fuel elements disposed side-by-side and held in spaced relationship as a cluster or bundle. It is necessary for the fuel elements to be spaced from one another to allow coolant to flow between them.

It is usual to transpose or shuffle fuel element assemblies a number of times during their useful life from one position in the core to another in such a pattern that the temperature differences of various parts of the core are kept within tolerable limits. When the fuel in the fuel elements of a fuel element assembly is spent, the fuel element assembly is removed from the core and a fresh fuel element assembly placed in the core. A fuel element assembly is usually removed during a transposition and so a fresh fuel element assembly does not necessarily occupy the position of the one removed. When the fuel element assemblies are being moved into and out of the core for these purposes the fuel element assemblies are liable to be subjected to rough usage, such as being unintentionally banged against parts of the reactor, and so it is necessary for the fuel element assembly to be contructed in a robust manner.

In each fuel element assembly the fuel elements comprise nuclear fuel material, for example uranium dioxide pellets, sealed in a tubular cladding or sheath of for example, a zirconum alloy or stainless steel. The cladding is made as thin as possible in order to reduce its absorption of neutrons and this has formerly been thought to have the undesirable effect of reducing the mechanical strength of the claddings to such an extent that difficulties are experienced in joining these to form a fuel element assembly having the desired robustness. The reason for this is that when in use vibrational displacements and differential thermal expansions often occur between adjacent fuel elements in fuel element assemblies, and so it has been felt necessary to provide spacing means between these fuel elements which will accommodate the forces resulting from these vibrational displacements and the differential expansions without damaging the claddings. This has resulted in quite a number of proposals for fuel element spacing means which allow portions of the claddings of adjacent fuel elements to move relative to one another at the spacing means to avoid any strain on the cladding and this has inevitably retraced to some degree from the desired robustness of the fuel element assembly.

Another problem that has resulted from the use of thin claddings is that any rubbing of a cladding by, say the spacing means between two claddings may result in rupturing one or both of the claddings. Rupturing of a cladding will cause contamination of the coolant passing between the fuel elements and circulation of contaminated coolant will eventually contaminate the whole of the reactor.

On the other hand, should excessive relative movements occur between adjacent fuel elements the claddings may be distorted at the spacing means joining them that the claddings may be ruptured.

One object of the present invention is to provide a fuel element assembly wherein the claddings of adjacent fuel elements are joined by spacing means which substantially prevent relative movements betwen the claddings at the spacing means thus reducing the hazard of damage occurring to the claddings in use, which provide a fuel assembly having the desired robustness required when being moved into or out of the reactor core, but which will prevent undue strains being placed on the claddings when excessive relative movements occur between them.

A further difficulty which arises with thin claddings is that if the fuel element spacing means are welded or brazed to the cladding, care has to be taken to avoid the cladding being damaged by the heat of the welding or brazing operation which may weaken the cladding or puncture the cladding by melting it.

Another object of the invention is to provide a fuel element assembly having spacing means welded or brazed to the claddings and in which there is less likelihood of a cladding being damaged by the heat of the welding or brazing operation.

According to the present invention there is provided a nuclear reactor fuel element assembly, comprising a plurality of longitudinally extending fuel elements disposed side-by-side in spaced relationship to provide fuel element flow path gaps between them, each fuel element comprising a nuclear fuel material, and a cladding surrounding the fuel material and one of a plurality of pairs of pads disposed in each of a sufficient number of the said gaps to space all of the fuel elements at an intermediate position along the lengths thereof, with each pair of pads in a gap extending towards one another across that gap from two adjacent claddings to which the pair of pads are attached, a perforated end plate joining all of the ends of fuel elements at one end, and means joining all of the ends of the fuel elements at the other end, and wherein the improvement comprises a joint between each two pads forming a said pair in a gap, each joint having a weaker breaking strength than that of the claddings to which those two pads are joined.

Preferably the said means joining all of the other ends of the fuel elements comprises a further perforated end plate.

Furthermore it is preferable that the said breaking strength of each joint is within the range 5% to 50% of the breaking strength of joints joining the said pads to the said claddings.

Specific embodiments of the invention will now be described, by way of example, with reference to the drawings in which.

Figure 3:
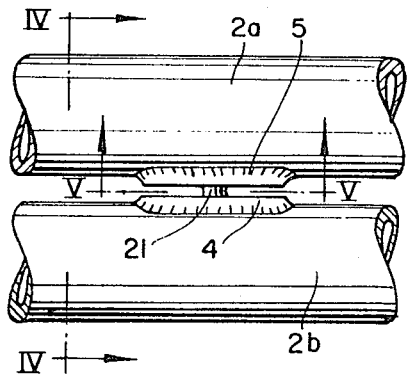
Figure 4:
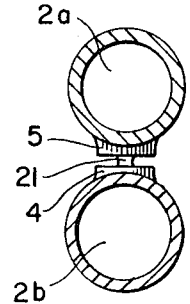
Figure 5:
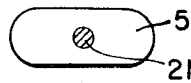
Figure 6:
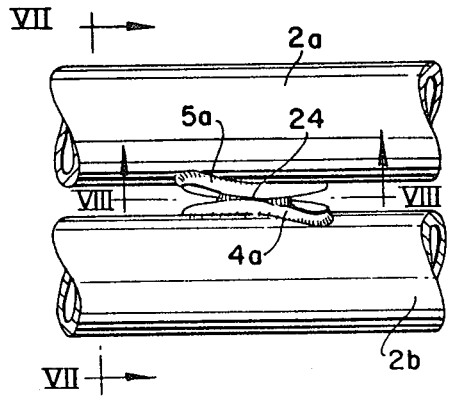
Figure 7:
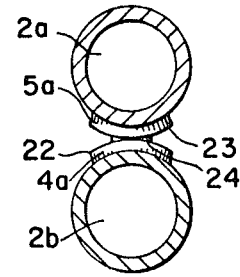
Figure 8:
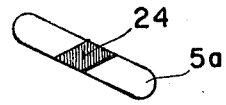
Figure 9:
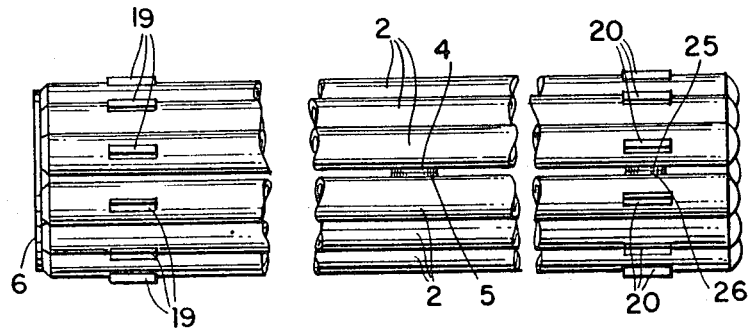

FIG. 3 shows an enlarged side view of portions of two fuel elements having two pads with a welded joint between them, FIG. 4 is a sectional end view along IV—IV, FIG. 3, FIG. 5 is a sectional view along V—V, FIG. 3, FIG. 6 shows a similar side view of FIG. 3, but with different shaped pads, FIG. 7 is a sectional end view along VII—VII, FIG. 6, and FIG. 8 is a sectional view along VIII—VIII, FIG. 6 and FIG. 9 shows a side view of a different fuel element assembly.

Figure 1:
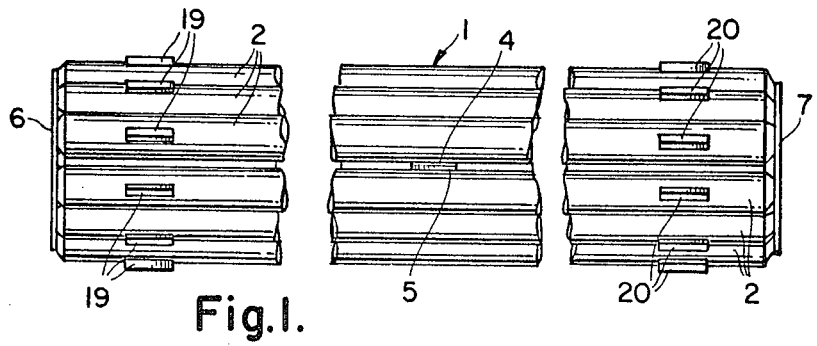
FIG. 1 shows a side view of a fuel element assembly.
Figure 2:
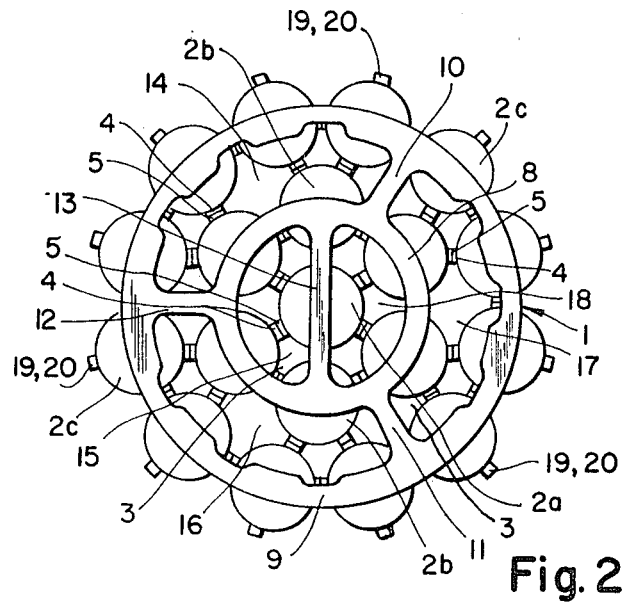
FIG. 2 shows an end view of FIG. 1.

Referring to FIGS. 1 and 2, a fuel element assembly generally designated 1 comprises a plurality of longitudinally extending fuel elements 2 disposed side-by-side in spaced relationship to provide fuel element flow path gaps 3 between them, with each fuel element comprising a nuclear fuel material, and a cladding surrounding the fuel material. One of a plurality of pairs of pads each designated 4 and 5 are disposed in a sufficient number of the gaps to space all of the fuel elements 2 at an intermediate position along the lengths thereof. Each pair of pads 4 and 5 in a gap extend towards one another across that gap from two adjacent claddings to which the pair of pads 4 and 5 are attached by, for example, a braze or weld. A perforated end plate 6 joins all of the fuel elements 2 at one end and means are provided joining all of the fuel elements 2 at the other ends in the form of a further perforated end plate 7. Both of the perforated end plates 6 and 7 are composed of annular webs 8 and 9 joined by webs 10 to 12 with the annular web 8 having a central web 13, as shown in FIG. 2 for end plate 6. The annular webs 8 and 9 and webs 10 to 13 have perforations 14 to 18 between them to allow coolant to flow between the fuel elements 2 and along the gaps 3.

In this embodiment the fuel element assembly 1 has ninteen fuel elements 2 disposed as a central element 2a, an inner concentric ring for six elements 2b, and an outer concentric ring of twelve elements 2c. The elements 2a, 2b, and 2c each comprise uranium dioxide fuel in pellet form sealed with a cladding of an alloy comprising by weight 1.2 to 1.7% tin, iron 0.18 to 0.24%, chromium 0.07 to 0.13%, total iron+chromium+nickel between 0.28 and 0.37% oxygen content between 1000 and 1400 p.p.m., balance zirconium except for impurities. The claddings are 0.015 inch in thickness and the elements 2a, 2b, and 2c are uniformly spaced to have an overall diameter of 3¼ inches. FIG. 2 shows the pads 4 and 5 which are all disposed at the same mid-position along the length of the fuel assembly 1. The element 2a is joined to each of the elements 2b by a pair of pads 4 and 5 by a braze or weld which will be described later, whilst each element 2b is similarly joined by a pair of pads 4 and 5 to two elements 2c. Thus a pair of pads 4 and 5 are disposed in a sufficient number of gaps 3 to space all of the fuel elements 2a, 2b, and 2c at an intermediate position along their lengths.

The perforated end plates 6 and 7, which are of the same zirconium alloy as the claddings of the element 2a, 2b, and 2c are welded to the ends of each of these claddings. Two groups of wear pads 19 and 20 are provided, each disposed adjacent one end of the elements 2a, 2b, and 2c. The wear pads 19 and 20 are of the same zirconium alloy as the claddings of the elements 2c and protect them from damage when the fuel element assembly 1 is being moved into and out of a fuel channel in a reactor core (not shown). The wear pads 19 and 20 also locate the fuel element assembly 1 centrally in the fuel channel.

In FIGS. 3, 4 and 5 one of the pairs of pads 4 and 5 is shown enlarged, it will be appreciated that all of the pairs of the pads 4 and 5 are similar and so a description of one pair will apply to all of them. The pads 4 and 5 may be electrical resistance welded or brazed to the claddings of the elements 2b and 2a respectively. If brazed the brazing medium may comprise by weight beryllium 5%, balance zirconium except for impurities.

The pads 4 and 5 are projection welded together by a weld 21 which bridges a gap between the pads 4 and 5. The weld 21 may be obtained by providing a core shaped projection on the pad 4 and a cylindrical projection on the pad 5, and urging these projections together whilst they are electrical resistance welded to one another to provide the weld 21. The cross-sectional area of the weld 21 smaller than the brazes or welds between the pads 5 and 4 of the elements 2a and 2b respectively and is chosen so that the weld 21 has a weaker breaking strength than that of the claddings 2a and 2b. Preferably the weld 21 has a breaking strength within the range 5% and 50% of the brazes or welds joining the pads 5 and 4 to the claddings of the elements 2a and 2b respectively. This will ensure that there is less likelihood of a break occurring in use between the brazes or welds to free either the pad 5 from the cladding of the element 2a, or the pad 4 from the cladding of the element 2b. Should either of the pads 4 or 5 be freed from its respective cladding in this manner then that cladding may be punctured immediately by a portion of cladding being pulled out by the pad and later by being rubbed by its pad 4 or 5. A break occurring at the weld 21 can also cause rubbing between the pads 4 and 5 and so the claddings of the elements 2a and 2b are protected.

The pads 4 and 5 are elongated in a direction extending along the length of the fuel element to which it is attached. The pads 4 and 5 have rounded ends when viewed from the side of the element to which they are attached to reduce turbulence in the coolant flowing over them.

In FIGS. 6, 7, and 8 similar parts to those in FIG. 1 are designated by the same reference numerals and the previous description is relied upon to describe them. In this embodiment the pads 4a and 5a perform the same function and are disposed in the same positions as the pads 4 and 5 in FIGS. 1 to 5. The pads 4a and 5a each have a convex surface 22 and 23 respectively and the joint between them, which in this case is a braze 24. The pads 4a and 5a extend along crossing paths, both of which slope relative to the longitudinal axis of the fuel elements 2b and 2a respectively to whose claddings they are electrically welded. It will be seen that the pads 4a and 5a are brazed at an intermediate position along their lengths to one another where they cross one another.

As in the previous embodiments the pads 4a and 5a are of the same zirconium alloy as the claddings to which they are attached, and the braze 24 is made using a brazing medium comprising by weight beryllium 5%, balance zirconium except for impurities.

This embodiment has welds between the claddings or the sheaths, and a braze 24 of the same strengths as the corresponding joints in the previous embodiments. An advantage in having the pads 4a and 5a extending along crossing paths is that should these pads become separated in operation by a break in the braze 24 then with any movements of one pad relative to another it is less likely for one of the pads 4a or 5a of a pair becoming lodged in end to end engagement with the other pad of that pair.

Referring to FIG. 9 similar parts to those shown in FIGS. 1 and 2 are designated by the same reference numerals and the previous description is relied upon to describe them. In this embodiment the perforated end plate 7 (FIG. 1) has been replaced by a further group of pairs of pads 25 and 26. The pads 25 and 26 are distributed between the fuel elements 2 in the same manner as the pads 4 and 5 and are secured to one another and the claddings in the same manner as the pads 4 and 5.

In a different embodiment the pads 4, 5, and 25 and 26 are replaced by pads similar to pads 4a and 5a (FIGS. 6 to 8).

I claim:

1. A nuclear reactor fuel element assembly, comprising a plurality of longitudinally extending fuel elements disposed side-by-side in spaced relationship to provide fuel element flow path gaps between them, each fuel element comprising a nuclear fuel material, and a cladding surrounding the fuel material, and one of plurality of pairs of pads disposed in each of sufficient number of the said gaps to space all of the fuel elements of an intermediate position along the lengths thereof, with each pair of pads in a gap extending towards one another across the gap from the two adjacent claddings to which the pair of pads are attached by a joint of one of welding or brazing, a perforated end plate joining all of the ends of fuel elements at one end, and means joining all of the fuel elements at the other end, and wherein the improvement comprises a joint of one of welding or brazing securing each two pads together forming a said pair in a gap, each joint securing the two associated pads together against relative movement and being of smaller cross-sectional area than the joints between the pads and the claddings and having a weaker breaking strength than that of the claddings to which those two pads are joined.

2. A fuel element assembly as defined in claim 1, wherein said means joining all of the other ends of the fuel elements comprises a further perforated end plate.

3. A fuel element assembly as defined in claim 1, wherein the said breaking strength of each joint is within the range of 5% to 50% of the breaking strength of joints joining the said pads to the said claddings.

4. A fuel element assembly as defined in claim 1, wherein each of said pads has a flat surface facing a similar flat surface on the other pad of that pair of pads, and the flat surfaces of a pair of pads are parallel and have the joint between them.

5. A fuel element assembly as defined in claim 1, wherein each of said pads has a convex surface facing the similar convex surface on the other pad of that pair, and the joint between each pair of pads extends between the convex surface of those pads.

6. A fuel element assembly as defined in claim 1, wherein each of said pads is elongated in a direction extending along the fuel element to which it is attached, and has rounded portions at each end when viewed from the side of the fuel element to which it is attached.

7. A fuel element assembly as defined in claim 4, wherein each of said pads of a pair extends along crossing paths, both of which slope relative to the longitudinal axis of the fuel element to which it is attached. Each pair of pads are joined to one another where they cross one another.

References Cited

UNITED STATES PATENTS

| | | | |
|---|---|---|---|
| 3,105,037 | 9/1963 | Weems | 178—81 |
| 3,344,036 | 9/1967 | Haslam et al. | 176—78 |
| 3,345,267 | 10/1967 | Nazzer et al. | 176—78 |
| 3,389,057 | 6/1968 | McGregor et al. | 176—81 X |
| 3,390,053 | 6/1968 | Tarasuk et al. | 176—78 |
| 3,278,388 | 10/1966 | Thome | 176—78 |

CARL D. QUARFORTH, Primary Examiner

G. G. SOLYST, Assistant Examiner

U.S. Cl. X.R.

176—77, 78